United States Patent [19]

Albisetti et al.

[11] Patent Number: 5,061,792

[45] Date of Patent: Oct. 29, 1991

[54] PREPARATION OF CHITOSAN SALTS IN AQUEOUS ALCOHOLIC MEDIA

[75] Inventors: Charles J. Albisetti, Rehoboth, Del.; John E. Castle, Kennett Square, Pa.

[73] Assignee: University of Delaware, Newark, Del.

[21] Appl. No.: 451,908

[22] Filed: Dec. 18, 1989

Related U.S. Application Data

[63] Continuation-in-part of Ser. No. 329,313, Mar. 27, 1989, abandoned.

[51] Int. Cl.$^5$ .................. C08B 37/00; C07H 1/00; C07H 13/00
[52] U.S. Cl. .................. 536/20; 536/55.3; 536/119; 536/124
[58] Field of Search ............. 536/20, 119, 124, 55.3; 514/55

[56] References Cited

U.S. PATENT DOCUMENTS

| | | | |
|---|---|---|---|
| 2,040,879 | 5/1936 | Rigby | 536/20 |
| 2,040,880 | 5/1936 | Rigby | 536/20 |
| 2,795,579 | 6/1957 | Doczi | 536/20 |
| 4,574,150 | 3/1986 | Austin | 536/20 |
| 4,881,343 | 11/1989 | Sannan et al. | 428/17 |

FOREIGN PATENT DOCUMENTS

87/07618 12/1987 World Int. Prop. O. ............ 536/20

*Primary Examiner*—Ronald W. Griffin
*Assistant Examiner*—Everett White
*Attorney, Agent, or Firm*—Dean R. Rexford

[57] ABSTRACT

Chitosan is converted to dry, free-flowing, water-soluble chitosan salts by heterogeneous reaction between particulate chitosan suspended in about 5 to about 50 parts by weight of a $C_1$ to $C_3$ monohydric alcohol containing an amount of water sufficient to raise the dielectric constant of the alcohol to at least about 30 and not more than about 40. Operable acids are slected from defined aliphatic and aromatic carboxylic, aromatic sulphonic, and inorganic acids having a first hydrogen pKa in water at room temperature of less than about 5.

6 Claims, 1 Drawing Sheet

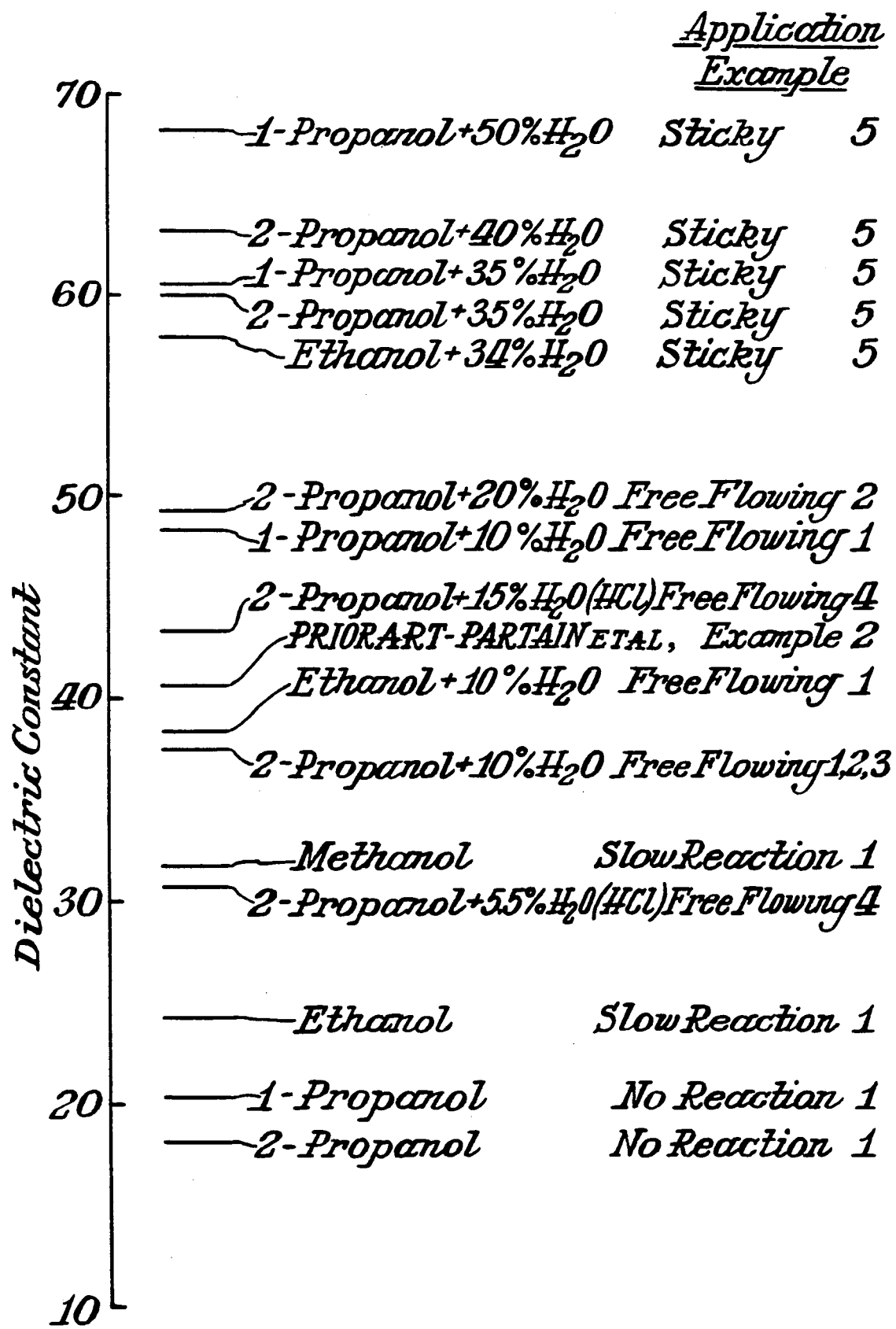

PREPARATION OF CHITOSAN SALTS IN AQUEOUS ALCOHOLIC MEDIA

This application is a continuation-in-part of our earlier filed application Ser. No. 07/329,213 filed Mar. 27, 1989, now abandoned.

BACKGROUND AND PRIOR ART

This invention pertains to dry, free-flowing, water-soluble salts of chitosan and a method for preparing them.

Chitosan, a deacetylated chitin, is a cation-active poly-primary amine with diverse applications in fields such as dispersing agents, adhesives, pesticides, waste water treatment, food processing and wound healing. Chemically, chitosan is predominantly poly-1,4-(2-amino-2-deoxyglucose). Normally chitosan is prepared from chitin by alkaline hydrolysis whereby the chitin is sufficiently deactylated to become soluble in 1–4% acetic or formic acid. The parent chitin isolate is derived, for example, from crustacean shells by decalcification and deproteinization with acid and alkali.

Rigby U.S. Pat. No(s). 2,040,879 and 2,040,880 (1936) are the classic references to the preparation of chitosan salts and list no fewer than 70 aqueous salt solutions thereof. It was not until the invention of Austin, as disclosed in U.S. Pat. No. 4,574,150, that dry free-flowing salts of chitosan were prepared.

In brief, the process of Austin comprises forming a slurry of chitosan in a liquid reaction medium and thereafter combining the slurry with a defined carboxylic acid. The product salt thus formed was normally recovered by filtration and drying in air. Austin illustrated the liquid reaction medium by disclosure and examples directed to heptane, acetone, 2-butanone, ethyl formate, ethyl acetate, methylene chloride, 1,2-dichloroethane, 1,1,2-trichloroethane, trichloroethylene, perchloroethylene, 1,4-dioxane, acetonitrile, tetrahydrofuran, nitroethane, and 2-nitropropane, optionally containing small amounts of water.

Although the invention of Austin is very useful in that it provides dry free-flowing, water soluble chitosan salts not previously available, the liquid reaction media taught have several disadvantages, especially in commercial use, such as real or suspected carcinogenesis, toxicity, environmental risk, severe flammability, peroxide formation and explosion hazard.

The $C_1$–$C_3$ monohydric alcohols of this invention, taken to mean those alcohols containing one hydroxyl group, are not taught by Austin, it is believed, because such alcohols, absent minimum amounts of water, are either inoperable or react unacceptably slowly under the conditions employed.

Partain et al. in published International Application WO87/07618 teach the preparation of several chitosan salts, some of which are comprised by the Austin patent and by the instant invention. Partain et al. teach heterogeneous reaction, as did Austin, between dissolved organic acids and chitosan dispersed in aqueous alcohols, inter alia, containing an amount of water in an amount "up to about 65 wt % of the total medium...., preferably 30 to 45 wt. %, most preferably 40 wt. %."

Partain et al. do not teach that any products were free-flowing.

The Austin patent does not teach the regulation of molecular weight in the product salts; Partain et al. teach against modification of molecular weight.

SUMMARY OF THE INVENTION

It has now been found that the processes of Austin and Partain et al., modified by employing $C_1$–$C_3$ monohydric alcohol reaction media containing, contrary to the teachings of Partain et al., only slightly more than enough water to raise the dielectric constant of the medium sufficiently to permit reaction, avoid or greatly reduce the disadvantages inherent in Austin's media, extend the scope of the Austin teachings and, unlike the disclosures of Partain et al., provide dry free-flowing chitosan salts.

Thus, it has been learned that the critical condition for operability at reasonable reaction rate lies not in the presence of water per se but in the dielectric constant of the alcohol-water medium. It has been found, for example, that for operability the medium must have a dielectric constant of at least about 24 as would prevail in a medium consisting of absolute ethanol. However, under these conditions the rate of reaction to produce the free-flowing salts of the invention is unacceptably slow. For this reason, it is preferred to employ media of higher dielectric constant, at least about 30.

Although free-flowing products have been obtained in media having dielectric constants greater than about 40, media not exceeding this value are preferred because of greater ease of drying. Partain et al. reported in their Example 2 the preparation of the 2-pyrrolidone-5-carboxylic acid salt in a medium comprising ethanol and water having a calculated dielectric constant of 40.6. The product was not reported to be free-flowing. Media having dielectric constants greater than about 55 produce sticky, nonfree-flowing products. Most preferred are media of dielectric constant about 35.

Thus, there is provided:

A process for preparing dry, free-flowing, water-soluble chitosan salts of aliphatic and aromatic carboxylic, sulfonic, and inorganic acids comprising the steps of:
(A) Combining to form a mixture;
  (1) one part by weight of particulate chitosan in which at least about 70% of all acetamide groups are deacetylated, to form free amino groups;
  (2) about 5 to about 50 parts by weight of a $C_1$–$C_3$ monohydric alcohol;
  (3) an amount of water sufficient to raise the dielectric constant of the alcohol of (2) to at least about 30 and not more than about 40;
  (4) about one-half to about four equivalents for each equivalent of free amino groups in said chitosan, of an acid selected from the group consisting of aliphatic and aromatic carboxylic, sulphonic, and inorganic acids selected from the group consisting of nitric, hydrochloric, and sulfamic acids, said acids having a first hydrogen pKa in water at room temperature of less than about 5, wherein
    (a) said aliphatic carboxylic acid comprises:
      (1) about six carbon atoms;
      (2) one to three carboxy groups;
      (3) zero to two hydroxy groups;
    (b) said aromatic carboxylic acid comprises a structure wherein a benzene ring is substituted with one substituent group selected from the group consisting of carboxy and acrylic acid and zero to one substituent group selected from the group consisting of methoxy, amino, and acetoxy;
    (c) said sulphonic acid is selected from the group consisting of alkylsulphonic acids, benzenesulphonic acid and toluenesulphonic acid;

(B) maintaining said mixture until reaction between said chitosan and said acid is essentially complete and;

(C) recovering and drying said chitosan salt at a temperature below the denaturation temperature.

There is also provided by this invention processes for the controlled hydrolysis of chitosan, thus affecting the solution viscosity of the invention salts, to meet the needs of the trade. This capability, not taught in the reaction media of Austin supra, is thought to be related to the relatively high dielectric constants of the invention aqueous alcohol mixtures.

BRIEF DESCRIPTION OF THE DRAWING

The drawing is a chart relating dielectric constants of reaction mixtures of the art and of the invention to media compositions and the results of reaction in these media. The compositions are keyed to the application examples.

DESCRIPTION OF THE PREFERRED EMBODIMENTS

Selection of media is made generally for such reasons as cost, availability, and toxicity. 2-Propanol is most preferred for these reasons. Methanol, presumably because of its greater similarity to water, is more likely than other alcohols of the invention to form sticky products and is therefore not preferred. Dielectric constants of mixtures are calculated as the sum of the product of published values of room temperature dielectric constants of the alcohol times its mole fraction in the medium plus the product of the dielectric constant of water times its mole fraction in the medium. The dielectric constants of pure materials were employed as follows:

TABLE 1

| Substance | Dielectric Constant |
|---|---|
| Water | 78.54 |
| Methanol | 32.68 |
| Ethanol | 24.3 |
| 1-Propanol | 20.1 |
| 2-Propanol | 18.3 |

Table 2 sets out, in three units common in the trade, the water concentrations in the alcohols of the invention needed to produce the dielectric constants set out in claims. The table demonstrates that water concentration alone is inadequate to describe the dielectric condition of the medium; the required concentrations vary from alcohol to alcohol.

TABLE 2

| | Medium Dielectaric Constant | Vol % Water | Mol % Water | Wt % Water |
|---|---|---|---|---|
| Methanol | — | — | — | — |
| Ethanol | 30 | 3.5 | 10.5 | 4.4 |
| 1-Propanol | 30 | 4.7 | 17.0 | 5.8 |
| 2-Propanol | 30 | 5.4 | 19.4 | 6.7 |
| Methanol | 35 | 2.3 | 5.1 | 2.9 |
| Ethanol | 35 | 7.1 | 19.7 | 8.8 |
| 1-Propanol | 35 | 7.6 | 25.5 | 9.3 |
| 2-Propanol | 35 | 8.3 | 27.7 | 10.3 |
| Methanol | 40 | 7.8 | 16.0 | 9.7 |
| Ethanol | 40 | 11.2 | 29.0 | 13.7 |
| 1-Propanol | 40 | 11.1 | 34.1 | 13.4 |
| 2-Propanol | 40 | 11.7 | 36.0 | 14.4 |

The processes of the invention are carried out in a heterogeneous reaction system comprising a reaction medium consisting of an alcohol and water as set out above, dispersed particulate chitosan, and at least about one-half equivalent of a dissolved acid, as defined herein, for each equivalent of free amino groups in the chitosan. The reaction rate, dependent, among other things, on the particle size of the chitosan and the temperature, generally requires about two hours for completion at room temperature to about 55 deg. C. Longer reaction times are not generally deleterious (but may affect molecular weight of the product as explained below); reaction times of approximately 24 hours cited hereinafter were selected largely for convenience. Generally the reaction mixture is maintained, i.e. allowed to stand, usually with occasional stirring, until reaction is essentially complete as can be determined by titration as set out in Example 1, infra. The product is isolated by filtration, optionally washing, generally with the liquid reaction medium or the undiluted alcohol, and drying in air or at modestly higher temperatures, say not over about 55 deg. so as to avoid denaturation of the chitosan.

The usual alcohol denaturants, for example those employed in ethanol, are without deleterious effect. Preferred acids are lactic, malic, citric, p-aminobenzoic, and acetylsalicylic acids. The most preferred acid is lactic acid, although all acids are approximately equally operable. Selection of a particular acid depends on the contemplated use of the product and the demands of the market place. In this connection, it noted that acetylsalicylic acid may find use as a pain killer; p-aminobenzoic and methoxycinnamic acids may find uses as sunscreens. The artisan will find other uses related to the properties of the acids per se. For many purposes lactic acid is the preferred acid.

The following examples further illustrate the invention.

EXAMPLE 1

This example demonstrates the need for water in the reaction medium.

In each of six experiments, 10 grams of particulate commercial chitosan (6% adsorbed water, 77% deacetylated, 10–20 mesh (1.7–.84 mm sieve openings)) derived from dungeness crab was placed in an Erlenmeyer flask equipped with a magnetic stirrer. An alcohol (100 ml) containing, where noted, 10 vol. % deionized water and an amount of acid equivalent to twice the number of free amino groups in the chitosan was added. The mixture was stirred at room temperature about 24 hours. In some instances especially rapid reaction occurred and the mixture became too thickened to stir. In such cases the stirring was discontinued. The product was isolated by vacuum filtration, washed on the filter with the reaction medium alcohol, and air-dried, first at room temperature and then at 40 deg. C. Above about 60 deg., C chitosan may be denatured, depending, it appears, on its history. Calculation of yields assumed that 4% water was retained in the product salts after drying. Solubility in water was tested at the one percent level.

The conversion of amino groups to the salt form was determined by reaction of the salts in aqueous solution with a measured excess of standard sodium hydroxide and back titration with standard hydrochloric acid.

Solubility of salts was tested at the one percent level.

Table 3 shows the results:

TABLE 3

| Acid | Reaction Medium | Yield (%) | Solubility in Water | Within Claims |
|---|---|---|---|---|
| Acetic | 2-Propanol | 0 | Insoluble | No |
| Acetic | 2-Propanol + 10% Water | 88.1 | Completely | Yes |
| Lactic* | Abs. Ethanol | 0 | Slight | No |
| Lactic* | Ethanol + 10% Water | 100 | Completely | Yes |
| Acetic | 1-Propanol | 0 | Insoluble | No |
| Acetic | 1-Propanol + 10% Water | 100 | Completely | Yes |

*85% lactic acid in water

EXAMPLE 2

Table 4 following demonstrates the formation of representative examples of dry free-flowing, water-soluble chitosan salts of various acids having a first hydrogen pKa in water at room temperature of less than about 5. Acids are selected from the group consisting of aliphatic and aromatic carboxylic, sulphonic, and inorganic acids. The procedure was that of Example 1. Percentages are in vol. %

TABLE 4

| Acid | Reaction Medium | Yield (%) |
|---|---|---|
| Malic (1) | 2-Propanol + 10% water | 100 |
| Malic (1) (2) | 2-Propanol + 20% water | 100 |
| Citric (1) | 2-Propanol + 20% water | 13–20 |
| Tartaric (1) | 2-Propanol + 10% water | 48 |
| Salicylic | 2-Propanol + 10% water | 98 |
| Acetysalicylic | 2-Propanol + 10% water | 74 |
| p-Aminobenzoic (4) | 2-Propanol + 10% water | 38 |
| Cinnamic (5) | 2-Propanol + 10% water | 93 |
| 4-Methoxycinnamic (6) | 2-Propanol + 10% water | 50 |
| p-Toluenesulphonic | 2-Propanol + 10% water | 100 |
| Hydrochloric (37%) | 2-Propanol anhyd | 98 |
| Nitric (7) | 2-Propanol | 69 |
| Sulfamic | 2-Propanol + 10% water | 100 |
| Benzoic | 2-Propanol + 10% water | 56 |
| Oxalic (1) | 2-Propanol + 10% water | 84 |
| Benzenesulphonic | 2-Propanol + 10% water | 98 |

(1) Only the first hydrogen reacted.
(2) 25 deg. C. for 1 hr., 35–40 deg. C., 2 hrs., Gulf of Mexico brown shrimp.
(3) Rapid reaction, 2.3 hrs.
(4) Because of poor solubility, mixture was warmed to 35–40 deg. C. before adding chitosan. Stirred 1 hr. at 50 deg. C. and allowed to stand 22 hrs. at room temp.
(5) As in (4) above, mixture was warmed to 30 deg. C. and allowed to stand 22 hrs. at room temperature.
(6) Because of poor solubility of methoxycinnamic acid, 75 ml of reaction medium was added.
(7) 85 ml 0.1 N $HNO_3$ in 516 ml 2-propanol (40.5 parts by weight 2-propanol)

EXAMPLE 3

This example demonstrates a process, within the invention, which permits the artisan to control the solution viscosity of the salts of the invention. Viscosity is known, of course, to be related to the molecular weight; in the invention case, primarily, but not linearly, to the molecular weight of the chitosan in the salts of the invention. It has been found that reduction in molecular weight in the invention process is due to acid catalyzed hydrolysis, although alcoholysis to yield terminal acetal groups is also possible. Control over hydrolysis (or alcoholysis) in the invention process can be exercised by limiting or increasing exposure to reactant acid. This can be variously accomplished, e.g. by adding acid to the reaction medium dispersion more rapidly that it can react with the chitosan, if hydrolysis is desired, or by slow addition if hydrolysis is not desired. Alternatively one can vary the degree of exposure to acid by varying the reaction time. Other means for regulating molecular weight such as adjusting the reaction temperature, will occur to the skilled artisan.

Different segments of the trade often require different viscosity materials. For example, the cosmetics trade generally specifies low viscosity materials.

The following laboratory example illustrates the above-mentioned processes.

Particulate chitosan (100 g containing about six g water. Derived from Pacific shrimp) was placed in a 3-liter, 3-neck, round-bottom flask equipped with a mechanical stirrer. One liter of 2-propanol containing 10% water was added. To the stirred slurry was added rapidly 107.2 g of 50% aqueous lactic acid in a thin stream during three minutes. The acid container was rinsed into the reaction flask with 200 ml of additional 2-propanol containing 10% water. Within ten minutes the reaction mixture had thickened and stirring became difficult. Additional propanol-water mixture (200 ml) was added.

After two hours, the slurry was filtered and washed with two liters of anhydrous 2-propanol in four portions. The pale yellow product was air-dried in a fume hood for two hours and then overnight in an air oven at 40 deg C. The yield was 140 g. of product containing 4% moisture corresponding to a 100% yield. Titration, as described above, showed a ratio of lactic acid to amino groups of 0.95/1.0.

The viscosity of a 1% water solution was measured. The solution was prepared by stirring 5 g of the salt product in 500 ml of deionized water for about 2.5 hrs. The cup of a Model LVF Brookfield viscometer was filled with a portion of the solution and readings were obtained at 60 rpm using a #2 spindle. The readings were corrected according to tables furnished by the manufacturer and a calibration factor was established by measuring the viscosity of anhydrous ethylene glycol of known viscosity. The corrected viscosity of the invention salt was found to be 64.4 centipoise.

In a parallel experiment wherein the 50% acid, diluted with the 2-propanol/water mixture in the ratio of 1.0 to 3.4 (g/ml), was added to a chitosan slurry in eight portions at fifteen minute intervals. The mixture was stirred for a total of 2.25 hrs. when the product was isolated as before. The viscosity of a 1% solution, measured and corrected as before, was found to be 118 centipoise, almost twice that of the previous product.

EXAMPLE 4

This example extends showings to inorganic acids.

(A) 10 g quantity (9.4 g dry basis) of particulate dungeness crab chitin was placed in a 125 ml Erlenmeyer flask. To the stirred mixture was added 90 ml of anhydrous 2-propanol and 8.35 g of 37% aqueous hydrochloric acid. Stirring was continued at room temperature for 19.5 hrs. The water for this system was furnished by the aqueous hydrochloric acid and amounted to a concentration of about 5.5% by volume in the 2-propanol. The product was filtered, washed with 2-propanol and dried at 40 deg C. The yield was 98% and the ratio of HCl to amino groups was 0.96.

The solution viscosity of a one percent aqueous solution measured as in Example 3, was 12.5 centipoise. It should be noted that the observed viscosity cannot be compared to earlier viscosities because viscosities in the two cases were measured on different salts.

(B) In a comparative example, 20 g of dungeness crab chitosan of the same lot was placed in a 500 ml Erlenmeyer flask along with 200 ml of 2-propanol containing 10% water and 16.7 g of 37% aqueous hydrochloric acid. The water content of the reaction mixture was approximately 15%. The mixture was stirred for 170 hrs. at room temperature.

The product was filtered, washed with 2-propanol and dried at 40 deg. C. The yield was quantitative and the ratio of HCl to amino groups was 1.00. The viscosity, measured as above, was 5.8 centipoise, approximately one-half that found in the product of the shorter reaction time. Should one wish to produce a product of higher viscosity, one can do so, for example, by limiting exposure to acid as described in Example 3.

EXAMPLE 5 (Prior Art)

This example, consisting of several experiments, demonstrates that the range of water concentrations taught by W087/07618 leads, unlike the teachings of the instant application, to products which are not free-flowing.

(A) To the mixture consisting of 10 g of particulate chitosan derived from Gulf of Mexico brown shrimp, 75 ml of 70/30 (vol) mixture of 2-propanol and water, was added a solution of 15.2 g of 50% lactic acid diluted with a 30 ml of 70/30 (vol) mixture of 2-propanol and water. Thus counting the water in the lactic acid and the 6% moisture in the chitosan, the total concentration of water was 35.2%.

On stirring with a glass rod, the mixture turned to gel in two minutes. After intermittent stirring during one hour, a mush of gel had settled leaving some supernatant liquid. There was no change after 48 hours. The mixture was unfilterable and was not free-flowing.

(B) The experiment of (A) above was repeated with the change that the chitosan was derived from Pacific shrimp and the alcohol employed was 1-propanol. The water content was 35.3%. At the end of one hour a mush of rubbery gel had settled; after 48 hours the particles had agglomerated to a rubbery cake. The product was not free-flowing.

(C) The experiment of (B) above was repeated with the change that the acid employed was sulfamic acid. The water content was 50.3%. The medium was prepared from 50 ml 1-propanol and 50 ml deionized water. Half of this was used to dissolve the solid sulfamic acid. Heating to 55 deg. C was necessary to dissolve the sulfamic acid.

When the warm sulfamic acid solution was added to the chitosan slurry, gel lumps formed at once. After 48 hours the gel had agglomerated forming some large soft lumps which were not free-flowing.

(D) The experiment of (B) above was repeated with the change that the chitosan was derived from dungeness crab, the alcohol was ethanol and the acid was glacial acetic acid. The water content was 33.6%. The medium was prepared from 66.7 ml of absolute ethanol and 33.3 ml of deionized water.

When the acetic acid was poured into the stirred chitosan slurry, a solid gel cake formed within a minute. After standing for two hours without change, the yellow, sticky gel was scraped into a Buchner funnel. No filtrate could be drawn from the gel on application of vacuum even after adding 250 ml of denatured 95% ethanol to the funnel. The alcohol was poured off and the gel was transferred to a crystallizing dish. After sitting in a fume hood for four days a horny yellow mat of chitosan acetate with a strong odor of acetic acid remained in the dish. The product was not free-flowing.

(E) The experiment of (B) above was repeated with the change that the alcohol was ethanol, the acid was salicylic acid and the chitosan was derived from dungeness crab.

The medium was prepared by mixing 133.3 ml of absolute ethanol and 66.7 ml of water. Taking into account all sources of water, the concentration of water in the medium was 33.6%.

When 100 ml of the medium containing 11.7 g of dissolved salicylic acid was poured into the slurry of 10 g chitosan in 100 ml of medium, a thick, pale orange gel formed within two minutes. As there appeared to be unreacted chitosan present as white particles, the gel was allowed to stand at room temperature for 48 hours by which time the white particles had disappeared and the gel was translucent and sufficiently thick that it supported a stirring rod in the vertical position. The gel was not free-flowing.

(F) The experiment of (B) above was repeated with the change that the acid was benzoic acid. The medium was prepared from 120 ml of 2-propanol and 80 ml of deionized water. Counting all sources of water the concentration of water in the medium as used was 40.2%.

The benzoic acid was dissolved in 200 ml of medium and the solution was added to the Gulf of Mexico shrimp chitosan. Within two minutes the particles in the slurry began to swell and adhere to each other. After one hour the reaction mixture was a solid mass of unfilterable colorless gel particles. After standing 48 hours, the gel particles had agglomerated to a sticky mass. The product was not free-flowing.

(G) The experiment of (B) above was repeated with the change that the acid was p-toluenesulfonic acid.

The medium was prepared by mixing 110 ml of 2-propanol and 90 ml of deionized water. Counting all sources of water, the concentration of water in the reaction medium was 45.2%.

The p-toluenesulphonic acid was dissolved in the entire 200 ml of medium which was then added to the Gulf of Mexico shrimp chitosan. The suspension gelled immediately. After 48 hours the product was a stiff colorless gel. Surface evaporation produced a horny covering of chitosan p-toluenesulfonate. The product mass not free-flowing.

Having now disclosed our invention, we claim:

1. A process for preparing dry, free-flowing, water-soluble chitosan salts of aliphatic and aromatic carboxylic, sulfonic, and inorganic acids comprising the steps of:
   (A) Combining to form a mixture;
      (1) one part by weight of particulate chitosan in which at least about 70% of all acetamide groups are deacetylated to form free amino groups;
      (2) about 5 to about 50 parts by weight of a $C_1$-$C_3$ monohydric alcohol;

(3) an amount of water sufficient to raise the dielectric constant of the alcohol of (2) to at least 30 and not more than about 40;

(4) about one-half to about four equivalents for each equivalent of free amino groups in said chitosan, of an acid selected from the group consisting of aliphatic and aromatic carboxylic, sulphonic, and inorganic acids selected from the group consisting of nitric, hydrochloric, and sulfamic acids, said acids having a first hydrogen pKa in water at room temperature of less than about 5, wherein (a) said aliphatic carboxylic acid comprises:
  (1) two to about six carbon atoms;
  (2) one to three carboxy groups;
  (3) zero to two hydroxy groups;
(b) said aromatic carboxylic acid comprises a structure wherein a benzene ring is substituted with one substituent group selected from the group consisting of carboxy and acrylic acid and zero to one substituent group selected from the group consisting of methoxy, amino and acetoxy;
(c) said sulphonic acid is selected from the group consisting of alkylsulphonic acid, benzenesulphonic acid and toluenesulphonic acid;

(B) maintaining said mixture until reaction between said chitosan and said acid is essentially complete and;

(C) recovering and drying said chitosan salt at a temperature below the denaturation temperature.

2. The process of claim 1 wherein said acid is lactic acid.

3. The process of claim 2 wherein said alcohol is ethanol.

4. The process of claim 2 wherein said alcohol is 2-propanol.

5. In the process of claim 1, the regulation of molecular weight of the chitosan salt by adjusting the reaction temperature and the exposure of chitosan to acid.

6. The chitosan salt of 4-methoxycinnamic acid.

* * * * *